May 23, 1967 J. R. ZIMMERMAN, JR 3,321,700
METHOD AND APPARATUS FOR GEOPHYSICAL EXPLORATION BY MEASURING
TIME VARIATIONS IN THE EARTH'S MAGNETIC FIELD AT
A PLURALITY OF LOCATIONS
Filed April 3, 1963 2 Sheets-Sheet 1

JOHN R. ZIMMERMAN
INVENTOR.

BY *Sidney A. Johnson*
ATTORNEY

May 23, 1967   J. R. ZIMMERMAN, JR   3,321,700
METHOD AND APPARATUS FOR GEOPHYSICAL EXPLORATION BY MEASURING
TIME VARIATIONS IN THE EARTH'S MAGNETIC FIELD AT
A PLURALITY OF LOCATIONS
Filed April 3, 1963   2 Sheets-Sheet 2

JOHN R. ZIMMERMAN
INVENTOR.

BY Sidney C. Johnson

ATTORNEY

United States Patent Office 3,321,700
Patented May 23, 1967

3,321,700
METHOD AND APPARATUS FOR GEOPHYSICAL EXPLORATION BY MEASURING TIME VARIATIONS IN THE EARTH'S MAGNETIC FIELD AT A PLURALITY OF LOCATIONS
John R. Zimmerman, Jr., Dallas, Tex., assignor to Mobil Oil Corporation, a corporation of New York
Filed Apr. 3, 1963, Ser. No. 270,268
10 Claims. (Cl. 324—8)

This invention relates to geophysical exploration and more particularly to measurement of anomalies in electromagnetic waves penetrating the earth's crust, as produced by the occurrence of subterranean bodies having resistivity which contrasts with the resistivities of the surrounding formations.

In U.S. Patent No. 2,931,974, geophysical prospecting is disclosed involving measurement of the earth's magnetic field at the earth's surface. Fairly high intensity fields having frequencies of the order of 1 to 20,000 cycles per second were measured. In contrast with such high intensity fields, micro variations, of the order of one gamma and less, in the earth's magnetic field may be employed to locate and to determine the extent of subterranean anomalous bodies more completely and accurately than the use of higher intensity fields which ignore the manifestation of energy with which the present invention is concerned.

More particularly, in accordance with the present invention there is provided a method in which magnetic fields of very low frequency are measured simultaneously at points spaced vertically one from the other. From such measurements, there are generated impedance functions representative of the impedance at a given low frequency of the earth as controlled by measurements near formations having a dominant effect upon such impedance.

In one aspect, the lateral extent of a subterranean body is delineated by simultaneously generating a first reference signal and a first information signal representative of variations in the earth's magnetic field at a subterranean station adjacent to a boundary between the body and the formation and a first surface station respectively. Additionally, there is simultaneously generated a second reference signal and a second information signal representative, respectively, of the variations in the earth's magnetic field at the subterranean station and at a second surface station spaced laterally from the first surface station. There is then generated an output signal representative of the difference between the differences between the amplitude and/or phase of the given frequency component in the first reference signal and the first information signal and the second reference signal and the second information signal, respectively.

In accordance with a further aspect, the distance between two of the stations is varied and an output signal representing such differences is registered as a function of spacing between the stations.

For a more complete understanding of the present invention and for further objects and advantages thereof, reference may now be had to the following description taken in conjunction with the accompanying drawings in which.

Downwardly traveling electromagnetic waves in the earth of plane wave character are controlled in phase as well as amplitude by the resistivity of underlying strata. Some waves of this character may have as their source the activity of electromagnetic character in the sun resulting in the occurrence on the earth of magnetic storms. The downwardly traveling electromagnetic waves impinging the earth's surface may be considered to be planar in character. The energy therein is relatively low compared with the total magnetic field. In order to investigate the effect upon such waves of subterranean bodies, measurements must be made at frequencies at the lowermost end of the frequency spectrum, preferably at or below one cycle per second. Thus, the frequency of measurement is related to the depths of the zones of interest. The impedance of the earth to such waves is dependent upon the surface character as well as the subsurface character. The measurements such as described herein provide for indication of the nature of the subsurface bodies as reflected in the impedance of the earth.

Figure 1:
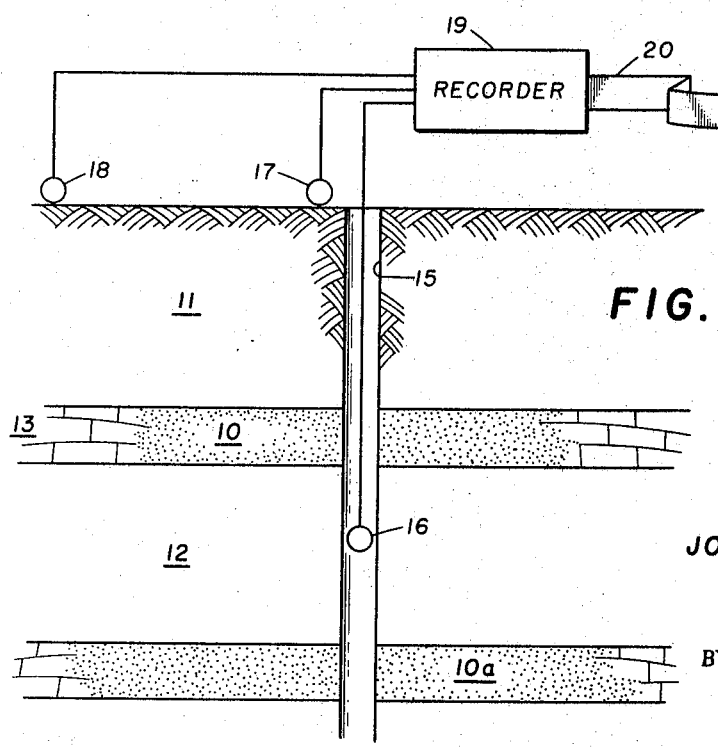
FIGURE 1 illustrates the invention employing a plurality of high sensitivity magnetic field detectors.

More particularly, and in accordance with one embodiment of the invention, FIGURE 1 illustrates a body or formation 10 located at substantial depth in the earth which is characterized by resistivity which substantially contrasts with the resistivity of the adjacent formations 11, 12, and 13. While the body 10 has been illustrated as of somewhat limited size, this configuration is employed for the purpose of the present description as to represent the general problem of detecting and establishing the extent of a given formation. In accordance with the present invention, the earth's magnetic field is measured at a plurality of points. A first detector 16 is located at a substantial depth in a borehole 15 which extends into the earth. Detector 16 is positioned in borehole 15 below the body 11. A second detector 17 is located at the earth's surface. A third detector 18 is located at the earth's surface but spaced laterally from detector 17 by a substantial distance preferably of the order of the depth of the detector 16. Measurements are then made of the time-variations in the earth's magnetic field with particular emphasis upon the detection of microvariations as may be present by reason of electromagnetic energy reaching the earth and traveling downward through the earth's crust. The measurements characteristic of at least a pair of functions for each of a plurality of exploring locations will permit identification of both the existence and extent of anomalous bodies.

Figure 2:
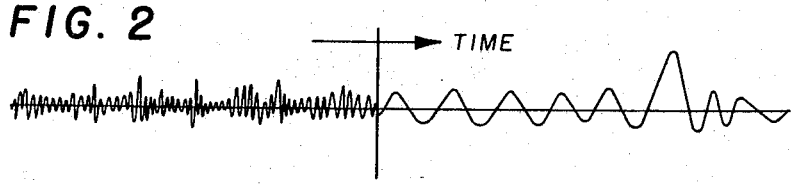
FIGURE 2 is a plot of natural geoelectromagnetic activities characteristic of sunrise and sunset.

While field fluctuations appear to be somewhat random, FIGURE 2 illustrates variations of a micro character in the earth's magnetic field as have been found to be somewhat characteristic of before and after dawn. It will be noted that in the period immediately before dawn the magnetic field is characterized by relatively high frequency components of a generally sporadic nature. At about dawn and at a time that has been found to be identifiable almost to within a few seconds, there is an abrupt transition from high frequency sporadic variations to far more quiescent conditions characterized by relatively smooth crests in the signal representing the earth's magnetic field.

In accordance with one embodiment of the present invention, the earth's magnetic field is simultaneously detected at the location of the units 16, 17, and 18. The signals thus detected preferably are recorded by recorder 19 in reproducible form as on a magnetic tape 20. The record 20 is applied to a wave analyzer 21. Records 31, 32, and 33 are produced by analyzer 21. The record 31 represents the phase-frequency spectrum of the earth's magnetic field as detected by unit 16. Records 32 and 33 similarly represent the phase-frequency spectrum of the signals from units 17 and 18. The φ-curves are in variable area form.

The records 31–33 are then passed through a scanner 35 which produces an output function from each record representative of the data thereon. The signal representative of the record 31 is applied by way of channel 36 to a pair of subtraction units 37 and 38. The signal from the record 32 is applied by way of channel 39 to the unit 37. The signal from the record 33 is applied by way of channel 40 to the unit 38. By this means there is produced on the output channel 41 of unit 37 a signal representative of the difference in phase between this magnetic field at the site of detectors 16 and 17. Similarly, on channel 42 there is produced a signal which is representative of the difference in phase between the magnetic fields at the locations 16 and 18. Signals on channels 41 and 42 are then applied to a subtraction unit 43 which produces a function which has been illustrated as recorded on the final record 44. This record represents the difference between the differences in phase of the signals at locations 16 and 17, and 16 and 18, respectively. With the downward travel of a plane wave impinging the earth in the region of the borehole 15, the phase of the wave will be dependent upon the resistivity of the earth through which it travels. The phase angle at the location of detectors 17 and 18 will differ and the difference may be more readily identifiable and pronounced by utilization of the detector 16 at a point in the subsurface zone adjacent to a boundary between the layer 10 and the adjacent formations.

Preferably, in accordance with the invention, a first record 44 is produced with the detectors 16, 17, and 18 arrayed as illustrated in FIGURE 1. Thereafter one of the detectors is moved and a second record such as record 44 is produced. A plurality of sets of data may thus be obtained which may be registered as functions of the spacing between two detectors, one being moved relative to the other. For example, if the detector 18 is moved laterally so that the distance from detector 17 is progressively greater, then the difference in the phase angle will become more pronounced. There will be a point in the curve at which the margin of the formation 10 will be delineated.

In carrying out the invention, it should be kept in mind that the magnitude of the earth's magnetic field is of the order of 50,000 gammas. Diurnal variations in the field are experienced with a magnitude of the order of 100 gammas. In accordance with the present invention, the measurements of the particular frequency components of interest are of the order of 1 or 2 gammas or less, peak to peak in their fluctuation. It has been found that with particularly sensitive detectors, such as are presently available, this level is of the order of $10^3$ above the noise level. The measurements of phase differences as above described preferably are limited to the microvariations superimposed upon the total field having a particular frequency characteristic. Preferably, for locating and identifying subsurface structures at substantial depth in the earth in the sedimentary section, the frequency at which measurement of the phase angles will be made and charted as a function of spacing between a pair of the detectors will be in the order of 1 cycle per second or less.

The detectors 16–18 may be of the type described in Patent No. 2,996,657, wherein gyromagnetic resonance is controlled by the external magnetic field to produce a signal of high resolution. Such devices are capable of measuring variations in the earth's magnetic field of the level above noted. Magnetometers of this type are manufactured and sold by Varian Associates, San Carlos, Calif. Somewhat similar devices are manufactured and sold by Texas Instruments Incorporated, Dallas, Tex., and designated as Meta-stable Helium Magnetometers.

In operation, measurements are made of the earth's magnetic field at such times as increased magnetic activity is present. The output signals from the magnetometers 16, 17, and 18 are recorded and applied to the analyzer 21. The analyzer 21 may be of type well-known in the art wherein a time function is transformed as to portray the phase-frequency distribution of the function. A suitable device for carrying out this operation is of the type described and claimed in Patent No. 2,752,092 to Frank J. McDonal. Alternatively, a system of the type illustrated and claimed in Patent No. 2,696,891 to Jacob Neufeld also is satisfactory. Such analyses may be readily accommodated in computers of the digital type wherein the analytical functions may be suitably programmed to provide the desired output functions such as represented by the records 31–33.

While the records 31–33 have been illustrated as variable area records for the purpose of the present description, it is to be understood that the output of the analyzer 21 may be applied directly to a scanner, the output of which is applied to subtraction units 37, 38. Units of the latter character are well-known in the art. For example, subtracters of suitable character are illustrated and described in the "Handbook of Automation Computation and Control," volume 2, by Grabbe et al., John Wiley & Sons, Inc., 1959, at page 27–02. An adder of suitable character is illustrated at page 18–10 to which one of the signals may be applied with polarity reversed to carry out the subtraction function. Thus, the devices required for carrying out the operations herein are readily avilable and well-known in the art. Regardless of the particular form of system employed, a first information signal function and a second information signal function respectively are generated and are representative of time variations in the earth's magnetic field at two spaced stations. A third information signal function is generated which is representative of time variations in the earth's magnetic field at a subterranean station spaced from both the two stations and adjacent to a boundary between the body 10 and the adjacent formations. There is then generated from the three information signal functions a first, second, and third phase-frequency spectral signal, and from this, there is generated a condition representative of the difference between the first and third spectral signals and the second and third spectral signals at a given frequency. The latter may be such as represented by the frequency at the center of the peak 45 of the curve on record 44. The signal at the peak frequency for each of a plurality of stations in which the spacing between the two surface detectors is varied provides a measure of the lateral extent of the formation 10.

Figure 3:
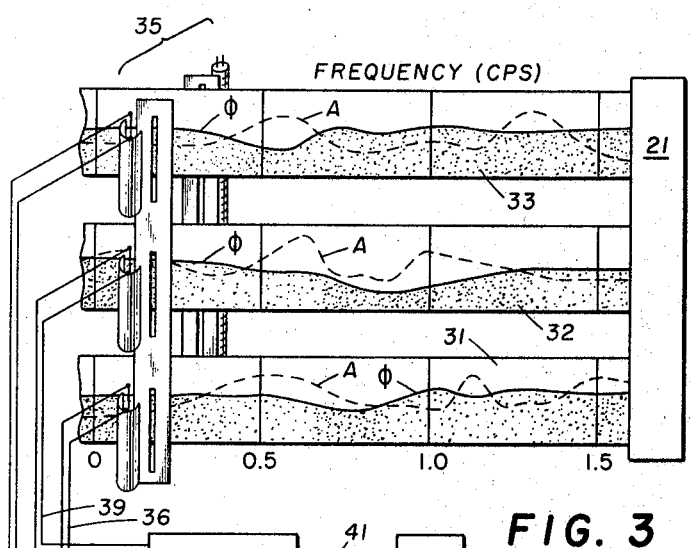
FIGURE 3 illustrates the phase-frequency characteristic of the outputs of the magnetometers of FIGURE 1.

The foregoing example relates to the measurement of the phase characteristic of the earth impedance as sensed at three stations, one of which is a subterranean station and one of which is movable. Similar measurements may be made of the amplitude characteristic. More particularly, the dotted curves A on records 31–33, FIGURE 3, are representative of amplitude-frequency characteristics of the signals detected at the three detecting stations. The amplitudes may be employed to produce differential signals on channels 41 and 42. The difference between such amplitude differential signals is recorded on the chart 44 as trace 46. For the latter type operation, the records 31–33 would be made variable area in dependance upon the dotted amplitude dependent curves A.

Figure 4:
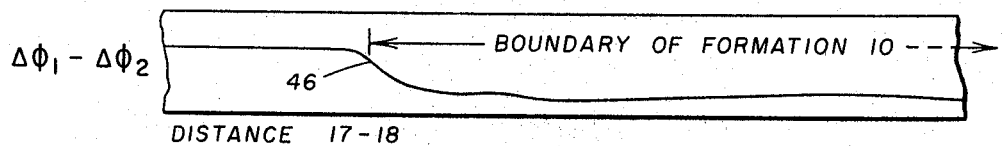
FIGURE 4 illustrates variations in the difference between relative phase angles as a function of lateral surface spacing.

FIGURE 4 illustrates an effect of the boundary between formations 10 and 13 on the data of variation in the position of detector 18 with respect to detector 17. A downwardly traveling electromagnet wave of planar character will vary in its phase relationship as between the locations of the two detectors. The difference between the phase differences will appear as indicated by the curve 46 of FIGURE 4. An amplitude counterpart of the phase curve shown in FIGURE 4 may be produced.

Figure 5:
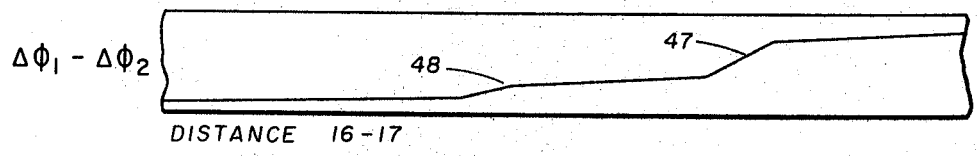
FIGURE 5 illustrates variations in the difference between relative phase angles as a function of depth.

In accordance with a further aspect of the invention, detector 17 may be fixed in position and the detector 16 moved to successively deeper detecting stations in hole 15. The phase changes 47 and 48 of FIGURE 5 are indicative of the passage through the formation 10 of the detector 16. In accordance with this aspect of the invention, the curve 48 represents the difference in phase between a given frequency component, preferably of the order of one cycle per second or less, of a microvariation in the earth's magnetic field. Similarly, an amplitude function may be produced which is dependent upon variations in the distance between detectors 16 and 17 and thus is the amplitude counterpart of the phase-distance curve of FIGURE 5.

Figure 6:
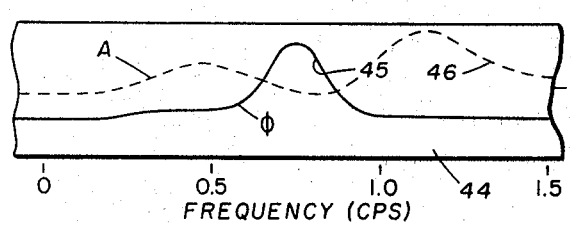
FIGURE 6 illustrates a modification of the invention.
Figure 6:
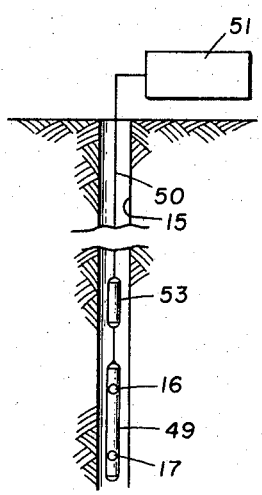
Figure 7:
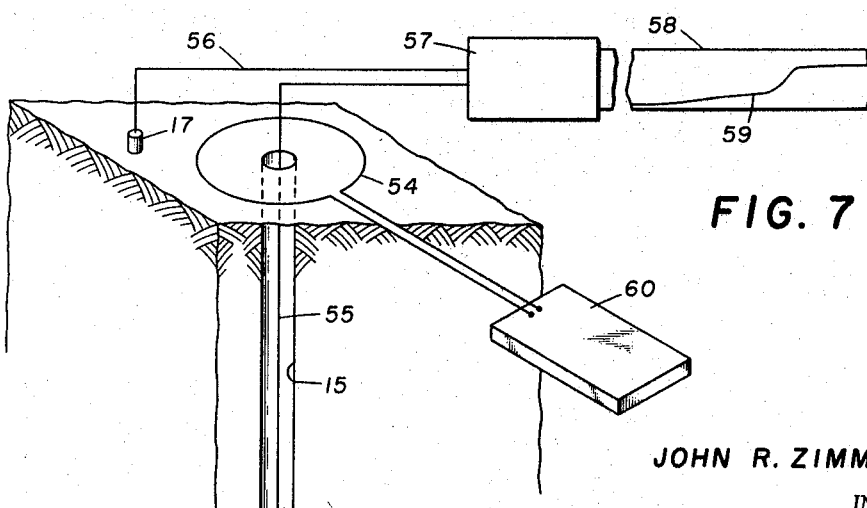
FIGURE 7 illustrates a further modification of the invention employing an artificial magnetic field source.

As illustrated in FIGURE 6, the detectors 16 and 17 may be moved together through the borehole 15. Detectors 16 and 17 are mounted on a sonde 49 supported by the cable 50 which provides for multichannel transmission to a unit 51.

Again a characteristic amplitude and/or phase change will be experienced as the detectors pass through formations of contrasting resistivity.

The foregoing operations have been described as relating to measurement of the earth's field which, as illustrated by the charts or records 31–33, is a fairly complex spectral function. In accordance with another aspect of the invention, the measurements may be made in a monotonic field as produced by an artificial field coil 53. The unit 53 may be a dipole suitably excited at a single frequency from a source included in the surface unit 51. It is shown mounted for movement with the sonde 49.

In accordance with a further modification, an artificial field is created by excitation of a coil 54 which is located in the earth's surface and is symmetrical with respect to the borehole 15. In this case, the detector 16 is lowered through the borehole while detector 17 is located at the surface. The detector 16 is connected by way of a channel 55 to the surface processing unit 57. The detector 17 is connected to unit 57 by channel 56. An output signal is then produced which is represented by curve 59 on chart 58. The curve 59 represents the difference between phases of the magnetic field generated by excitation of coil 54 by current of monofrequency character from a supply source 60. The difference in phase as between two detector outputs will depend upon the impedance of the earth's formations and the monofrequency character of the input signals together with the detection of fields below one gamma in magnitude. A corresponding amplitude function is also to be produced. One of the functions, or both of them, may permit delineation of the formation character with accuracy not heretofore possible.

Having described the invention in connection with certain specific embodiments thereof, it is to be understood that further modifications may now suggest themselves to those skilled in the art and it is intended to cover such modifications as fall within the scope of the appended claims.

What is claimed is:

1. In the determination of the lateral extent of a subterranean body having resistivity which contrasts with the resistivity of the formation surrounding said body, the method which comprises:
    (a) simultaneously generating a first reference signal and a first information signal representative of variations in the earth's magnetic field at a subterranean station adjacent to a boundary between said body and said formation and at a first surface station, respectively,
    (b) simultaneously generating a second reference signal and a second information signal representative of variations in the earth's magnetic field at said subterranean station and at a second surface station spaced laterally from said first surface station, respectively,
    (c) generating a first difference signal representative of the magnitude of the phase difference in a given frequency component in said first information signal and said first reference signal,
    (d) generating a second difference signal representative of the magnitude of a phase difference of a given frequency component in said second information signal and said second reference signal,
    (e) generating an output signal representative of the difference between the two difference signals, and
    (f) registering said output signal.

2. In the determination of the lateral extent of a subterranean body having resistivity which contrasts with the resistivity of formation surrounding said body, the method which comprises:
    (a) simultaneously generating a first reference signal and a first information signal representative of variations in the earth's magnetic field at a subterranean station adjacent to a boundary between said body and said formation and at a first surface station, respectively,
    (b) simultaneously generating a second reference signal and a second information signal representative of variations in the earth's magnetic field at said subterranean station and at a second surface station spaced laterally from said first surface station, respectively,
    (c) generating a first difference signal representative of the magnitude of the phase difference of predetermined frequency components in said first information signal and said first reference signal,
    (d) generating a second difference signal representative of the magnitude of a phase difference of said predetermined frequency components in said second information signal and said second reference signal,
    (e) generating an output signal representative of the differences between the two difference signals for each of said frequency components, and
    (f) registering the magnitude of said output signal as a function of the frequency of said components.

3. In the determination of the lateral extent of a subterranean body having resistivity which contrasts with the resistivity of formation surrounding said body, the method which comprises:
    (a) simultaneously generating a first reference signal and a first information signal representative of variations in the earth's magnetic field at a subterranean station and at a first surface station, respectively,
    (b) simultaneously generating a second reference signal and a second information signal representative of variations in the earth's magnetic field at said subterranean station and at a second surface station spaced laterally from said first surface station, respectively,
    (c) generating a first difference signal representative of the magnitude of the phase difference in a given frequency component in said first information signal and said first reference signal,
    (d) generating a second difference signal representative of the magnitude of a phase difference of a given frequency component in said second information signal and said second reference signal,
    (e) generating an output signal representative of the difference between the difference signals,
    (f) varying the depth of said subterranean station, and
    (g) registering said output signal in relation to a variation in depth of said subterranean station.

4. In the determination of the lateral extent of a subterranean body having resistivity which contrasts with the resistivity of formation surrounding said body, the method which comprises:
    (a) simultaneously generating a first reference signal and a first information signal representative of variations in the earth's magnetic field at a subterranean station adjacent to a boundary between said body and said formation and at a first surface station, respectively, (b) simultaneously generating a second reference signal and a second information signal representative of variations in the earth's magnetic field at said subterranean station and at a second surface station spaced laterally from said first surface station, respectively, (c) generating a first difference signal representative of the magnitude of the phase difference in a given frequency component in said first information signal and said first reference signal, (d) generating a second difference signal representative of the magnitude of a phase difference of a given frequency component in said second information signal and said second reference signal, (e) generating an output signal representative of the difference between the difference signals, (f) varying the location of one of the surface stations, and (g) registering said output signal in relation to variations in location of said second station.

5. In the determination of the configuration of a subterranean body having resistivity which contrasts with the resistivity of formations surrounding said body, the method which comprises:

(a) generating a first information signal and a second information signal respectively representative of time variations in the earth's magnetic field at two spaced apart stations, (b) generating a third information signal representative of time variations in the earth's magnetic field at a subterranean station spaced from both said two stations and adjacent to a boundary between said body and said formations, and (c) generating an output signal from the first, second, and third signals representative of the difference between the differences between the phase of a selected frequency component in the first and third signals and the second and third signals.

6. In the determination of the lateral extent of a subterranean body having resistivity which contrasts with the resistivity of formations surrounding said body, the method which comprises:

(a) generating a first information signal and a second information signal respectively representative of time variations in the earth's magnetic field at two spaced apart stations, (b) generating a third information signal representative of time variations in the earth's magnetic field at a subterranean station spaced from both said two stations and adjacent to a boundary between said body and said formations, (c) generating from the three functions a first, second, and third phase-frequency spectral signal, and (d) generating an output signal representative of the difference between the differences between the first and third spectral signals and the second and third spectral signals at a given frequency.

7. A system for determination of the lateral extent of a subterranean body having resistivity which contrasts with the resistivity of formations surrounding said body, comprising:

(a) a pair of magnetometers for generating a first information signal and a second information signal respectively representative of time variations in the earth's magnetic field at two spaced apart stations, (b) a third magnetometer for generating a third information signal representative of time variations in the earth's magnetic field at a subterranean station spaced from both said two stations and adjacent to one boundary between said body and said formations, (c) means individually responsive to the magnetometers for generating first, second, and third phase signals representative of the phase of predetermined frequency components in the first, second, and third information signals, and (d) means for generating an output signal representative of the difference between the differences between the first and third phase signals and the second and third phase signals at a predetermined frequency.

8. In the determination of the lateral extent of a subterranean body having resistivity which contrasts with the resistivity of the formation surrounding said body, the method which comprises:

(a) simultaneously generating a first reference signal and a first information signal representative of variations in the earth's magnetic field at a subterranean station adjacent to a boundary between said body and said formation and at a first surface station, respectively, (b) simultaneously generating a second reference signal and a second information signal representative of variations in the earth's magnetic field at said subterranean station and at a second surface station spaced laterally from said first surface station, respectively, (c) generating a first impedance signal representative of the magnitude of an impedance characteristic of a given frequency component in said first information signal and said first reference signal, (d) generating a second impedance signal representative of the magnitude of said impedance characteristic of a given frequency component in said second information signal and said second reference signal, (e) generating an output signal representative of the difference between the two impedance signals, and (f) registering said output signal.

9. In the determination of the lateral extent of a subterranean body having resistivity which contrasts with the resistivity of the formation surrounding said body, the method which comprises:

(a) simultaneously generating a first reference signal and a first information signal representative of variations in the earth's magnetic field at a subterranean station adjacent to a boundary between said body and said formation and at a first surface station, respectively, (b) simultaneously generating a second reference signal and a second information signal representative of variations in the earth's magnetic field at said subterranean station and at a second surface station spaced laterally from said first surface station, respectively, (c) generating a first amplitude signal representative of the magnitude of the difference between the amplitude characteristics for a given frequency component in said first information signal and said first reference signal, (d) generating a second amplitude signal representative of the magnitude of the difference between the amplitude characteristics for a given frequency component in said second information signal and said second reference signal, (e) generating an output signal representative of the difference between the two amplitude signals, and (f) registering said output signal.

10. In the determination of the configuration of a subterranean body having resistivity which contrasts with the resistivity of formations surrounding said body, the method which comprises:

(a) generating a first signal and a second signal respectively representative of time variations in the earth's magnetic field at two spaced apart stations, (b) generating a third signal representative of time variations in the earth's magnetic field at a subterranean station spaced from both said two stations and adjacent to a boundary between said body and said formations, and (c) generating a scalar output signal from the first, second, and third signals representative of the difference between the differences between the amplitudes of a selected frequency component in the first and third signals and the second and third signals.

References Cited by the Examiner

UNITED STATES PATENTS

| | | | |
|---|---|---|---|
| 2,291,692 | 8/1942 | Cloud | 324—8 |
| 2,575,349 | 11/1951 | Lee | 324—1 |
| 2,664,542 | 12/1953 | Lynn | 324—8 |
| 2,716,730 | 8/1955 | Williams | 324—8 |
| 2,931,974 | 4/1960 | McLaughlin et al. | 324—8 |
| 2,996,657 | 8/1961 | Varian | 324—5 |
| 3,014,177 | 12/1961 | Hungerford et al. | 324—8 |
| 3,136,943 | 6/1964 | Slichter | 324—7 |
| 3,149,278 | 9/1964 | Cartier et al. | 324—7 |

WALTER L. CARLSON, *Primary Examiner.*

G. R. STRECKER, *Assistant Examiner.*